United States Patent Office 3,228,837
Patented Jan. 11, 1966

3,228,837
ORAL ANABOLIC COMPOSITION AND
METHOD OF USE
Emanuel Kaspar, Berlin-Wilmersdorf, Rudolf Wiechert, Berlin-Lichterfelde, and Martin Schenck and Alfred Popper, Berlin-Frohnau, Germany, assignors to Schering AG, Berlin, Germany
No Drawing. Filed Mar. 6, 1962, Ser. No. 177,721
Claims priority, application Germany, Dec. 5, 1959, Sch 27,090; Jan. 20, 1960, Sch 27,300; Mar. 26, 1960, Sch 27,643
9 Claims. (Cl. 167—74)

This application is a continuation in part of our copending application Serial No. 73,495, filed December 5, 1960 for "Production of α,β-Unsaturated Ketosteroids Having a Methyl Group on the β-Position Carbon Atom," now Patent No. 3,134,792.

The present invention relates to a new oral anabolic composition and to the method of using the same whereby an anabolism is achieved by oral treatment, and more particularly to the use of steroids which, although the same do not contain a 17α-alkyl group can nevertheless be administered orally to achieve anabolic action.

Prior to the present invention it has always been considered necessary in order to obtain oral activity with an androgen to have a 17α-position alkyl group, e.g. a 17α-methyl group present. Thus, for example, testosterone is generally used intramuscularly or subcutaneously and can only be used orally by buccal absorption. 17α-methyl testosterone, on the other hand, can be administered orally, and upon oral administration is more active than testosterone. However, 17α-methyl testosterone is not a very effective anabolic agent.

It is therefore a primary object of the present invention to provide a new, highly effective anabolic agent which can be administered orally, and which upon oral administration has a high degree of activity.

It is another object of the present invention to provide a new androgen which does not contain a 17α-alkyl group, but which nevertheless can be administered orally to achieve a high degree of effectiveness as an anabolic agent.

Other objects and advantages of the present invention will be apparent from a further reading of the specification and of the appended claims.

With the above and other objects in view, the present invention mainly comprises an oral anabolic composition containing as the active ingredient either 1-methyl-Δ$^1$-androstene-17β-ol-3-one (which can also be designated as 1-methyl-Δ$^1$-androstenolone) or the 17-acetate thereof.

The composition of the present invention can be administered in the form of capsules, tablets, dragees or in the form of a liquid containing the active ingredient, and upon oral administration a high degree of anabolic effect is achieved.

As indicated above the compositions of the present invention may be in the form of drops, capsules, tablets, dragees, or the like containing the 1-methyl-Δ$^1$-androstene-17β-ol-3-one or the 1-methyl-Δ$^1$-androstene-17β-ol-3-one-17-acetate, and the compositions may be administered in varying amounts from about 5 mg. per day to about 60 mg. per day. In the minimum range the amount of active ingredient administered should be about 5–10 mg. per day, in the maximum range the amount of active ingredient administered should be between about 50–60 mg. per day, and most preferably, the amount of active ingredient administered is about 10–20 mg. per day. The compositions of the present invention may be used for all indications for which known anabolics have been used, for example in the treatment of consumptive diseases, for the treatment of generally run down conditions, for cachectic conditions, to promote convalescence, in the treatment of osteoporosis, chronic liver disorders, etc. The great advantage of the present invention is the possibility of oral administration and high degree of anabolic effect achieved thereby.

The further description below will illustrate this advantage.

Testosterone cannot be administered orally. It is partially destroyed by the gastric juices, in the liver it is inactivated by conjugation, and mainly by oxidation in the 17-position is converted into the poorly active metabolite (androsterone and etiocholanolone).

Contrary thereto, 17α-alkylated testosterone derivatives are practically not at all oxidizable in the 17-position, and therefore are active upon peroral administration. Thus, for example, methyl testosterone not only does not cause any increase in the excretion of 17-ketosteroids, but actually results in a lowering thereof. Δ$^1$-17-methyl testosterone also does not show any increase in 17-ketosteroids, and is active perorally. 17α-ethinyl-19-nortestosterone does not cause an increase in 17-ketosteroid excretion.

It is consequently clear that secondary 17β-hydroxyl groups are in vivo naturally oxidizable, while tertiary 17β-hydroxyl groups are not naturally oxidizable in vivo.

Consequently it was quite surprising to find that 1-methyl-Δ$^1$-androstene-17β-ol-3-one and its 17-acetate, the compound having a free secondary hydroxyl group or hydroxyl function is practically not at all oxidized. In clinical tests carried out on 18 patients it was found that a conversion to 17-ketosteroids only occurred in an amount of between 0–13%, thus further confirming other tests which proved the peroral activity of the 1-methyl-Δ$^1$-androstene-17β-ol-3-one of the present invention, as well as of its 17-acetate.

Clinical tests which were carried out showed that 1-methyl-Δ$^1$-androstene-17β-ol-3-one when administered orally in amounts of between 10 and 25 mg. per day exhibited a pronounced anabolic effect, measured by the reduction in N-excretion in 24 hour urine under conditions of unchanged protein intake.

The average N-retention per day amounted to 2–4 g., thereby proving that it is unnecessary to administer the tablets by buccal absorption. The catabolic effect of increased N-excretion occurring upon corticoid treatment (6 mg. prednisolone per day) can be compensated for by the administration of 25 mg. of 1-methyl-Δ$^1$-androstene-17β-ol-3-one per day.

Upon long duration peroral administration of up to 50 mg. per day of 1-methyl-Δ$^1$-androstene-17β-ol-3-one there is no influence on the liver function as determined by the following sensitivity tests: BSP, SGOT and SGPT determinations. In addition, undesirable hormonal side effects were practically non-existent (androgenic, progestational, estrogen).

The oral activity of the 1-methyl-Δ$^1$-androstene-17β-ol-3-one was also proved biochemically.

Oxidation in the liver of the 17-hydroxyl group of orally administered free steroid-$C_{17}$-alcohols results in inactivation of the active ingredient. It has been attempted by means of buccal absorption of free steroid-$C_{17}$-alcohols to by-pass the liver metabolism so as to avoid the above mentioned effect and to utilize such substances therapeutically. However, this method of application is very troublesome, and consequently has not been used to any great extent.

In order to interfere with the oxidation of the 17-hydroxyl group, which group is necessary in order to achieve a satisfactory activity, the general procedure has been to introduce a 17α-alkyl group into the steroid molecule to convert the secondary alcohol into a tertiary alcohol. Oral active preparations of this type, however, in practically all cases result in interference with the bile excretion and results in considerable changes in the liver function. The 17-alkyl group is therefore considered as a cause of the named undesirable side reactions. It has been found according to the present invention, in further investigations of human beings that, upon oral administration of 1-methyl-$\Delta^1$-androstene-17$\beta$-ol-3-one, the inactivation of the 17-hydroxyl group to the 17-ketosteroid by oxidation is very strongly reduced. By comparison tests with $\Delta^1$-androstenolone it was confirmed that the 1-methyl group is responsible for the protection of the 17-hydroxyl group against inactivation by 17-dehydrogenases of the liver.

Consequently, with 1-methyl-$\Delta^1$-androstene-17$\beta$-ol-3-one it is for the first time possible to have a significant, oral anabolic therapy, which can be confirmed clinically, and which does not have the undesirable effects on the liver as in the case of 17$\alpha$-alkyl-steroids.

The same effect has been determined for the 17-acetate of 1-methyl-$\Delta^1$-androstene-17$\beta$-ol-3-one, this acetate having the same oral activity as the free alcohol. Thus, clinical tests have shown that 1-methyl-$\Delta^1$-androstenolone-acetate upon peroral administration exhibits a good anabolic action. Under conditions of unchanged protein intake of 1.25 g./kg. of body weight per day a decrease of the N-excretion in 24 hour urine averaged:

1.92 g. per day upon administration of 10 mg. daily,
4.27 g. per day upon administration of 20 mg. daily.

The N-excretion in the stool remained unchanged. The administration was always oral. An increase in the dose to 40 mg. per day did not result in any particular increase in the protein anabolic effect, measured by the N-retention in the urine and stool. Of importance is the fact that no hormonal undesirable side effects were observed. In addition, water retention or influence of the electrolyte balance was observed.

The control of the liver function upon daily doses of up to 60 mg., for 3 to 5 weeks, resulted in no changes, particularly as determined by the sensitivity tests, and transaminase value. In patients with chronic liver disease there is no unfavorable influence in all liver function-tests during the treatment with 1-methyl-$\Delta^1$-androsten-17$\beta$-ol-3-one-17-acetate.

The following tests still further illustrate the advantageous effects of the compositions of the present invention:

Toxicity tests were carried out to determine the $LD_{50}$ upon oral administration to mice. The $LD_{50}$ for the free alcohol, i.e., 1-methyl-$\Delta^1$-androstene-17$\beta$-ol-3-one is 1.7 g./kg.; for the acetate, i.e., 1-methyl-$\Delta^1$-androstene-17$\beta$-ol-3-one-17-acetate, is more than 2 g./kg.

The activity of the compositions of the present invention was measured by determining the weight increase of the musculus levator ani (as an expression of the anabolic activity, and the weight increase of the seminal vesical (as an expression of the androgenic action).

The comparison substance which was used was 17$\alpha$-methyl-testosterone.

The animals which were used for the tests were male Sprague-Dawley rats, weighing from 80–100 g., which were castrated one week before the beginning of the tests.

PRODUCTION OF SUSPENSIONS OF TEST PREPARATIONS (a) *Suspension agent.*—30% gum arabic solution (gum arabic is stirred in a mortar to a 30% aqueous solution, and 1 thymol crystal is added per liter as a preservative).

(b) *Stock suspension.*—50 mg. of the preparation to be tested per cc. of gum arabic solution is used as stock suspension (the preparation is added dropwise into a mortar with the gum arabic solution and intensively stirred therewith).

(c) *Dilutions.*—Dilutions with gum arabic solution are made in proportions of 1:3, 1:10 and 1:30.

*Method of administration.*—Peroral 0.2 cc. of the respective suspension, that is 10; 3; 1 or 0.3 mg., respectively, of the substance tested per day.

*Testing procedure.*—6–10 animals were used per dose. The preparation to be tested was administered for a period of 2 weeks, except for Sundays, in the feed; on the 15th day, that is the day after the last administration, the animal was killed by chloroform narcosis.

TEST VALUES

Determination of the fresh weight of the levator ani or the seminal vesical (with content).

RESULTS

[The value given is the average weight increase in mg. per 100 g. rat, in comparison to untreated controls]

| | | | | |
|---|---|---|---|---|
| (a) 17$\alpha$-methyl-testosterone, mg./day | 10.0 | 3.0 | 1.0 | 0.3 |
| Levator ani, $\Delta$mg./100 g. | +17 | +11 | +7 | |
| Seminal vesical, $\Delta$mg./100 g. | +89 | +22 | +8 | |
| (b) 1-methyl-$\Delta^1$-androstene-17$\beta$-ol-3-one, mg./day | 10.0 | 3.0 | 1.0 | 0.3 |
| Levator ani, $\Delta$mg./100 g. | +33 | +6 | +4 | 0 |
| Seminal vesical, $\Delta$mg./100 g. | 0 | 0 | 0 | 0 |
| (c) 1-methyl-$\Delta^1$-androstene-17$\beta$-ol-3-one-17$\beta$-acetate, mg./day | 10.0 | 3.0 | 1.0 | 0.3 |
| Levator ani, $\Delta$mg./100 g. | +17 | +13 | +4 | |
| Seminal vesical, $\Delta$mg./100 g. | 0 | 0 | 0 | |

It is clear from the above that with the same doses, the same or higher anabolic action of the 1-methyl-$\Delta^1$-androstene-17$\beta$-ol-3-one or its 17-acetate is obtained as compared to 17$\alpha$-methyl testosterone, while being practically free of androgenic activity, which is in marked contrast to the strongly androgenic testosterone derivative.

The following examples are given to illustrate compositions in accordance with the present invention. The scope of the invention is not, however, meant to be limited to the specific details of the examples:

Example 1

A liquid preparation containing 1-methyl-$\Delta^1$-androstene-17$\beta$-ol-3-one is made which can be administered in the form of drops, and in which 1 cc. (30–35 drops) contains 2 mg. of the active agent.

COMPOSITION FOR 100 CC.

1-methyl-$\Delta^1$-androstene-17$\beta$-ol - 3 - one (active agent) _____ mg__ 200
Ethyl alcohol _____ cc__ 20
Propylene glycol _____ cc__ 25
Double distilled water, q.s. 100 cc.

The ethyl alcohol, propylene glycol and water together acts as the solvent for the active agent. The specific gravity of the liquid at 20° C. is 0.9992.

Example 2

This example relates to a preparation containing 1-methyl-$\Delta^1$-androstene-17$\beta$-ol-3-one-17-acetate as the active agent. The example relates to the preparation of gelatin capsules for oral administration, each capsule containing 25 mg. of the active ingredient.

COMPOSITION FOR 1 CAPSULE 25 mg. of 1-methyl-$\Delta^1$-androstene-17$\beta$-ol-3-one-17-acetate 75 mg. of 1-phenylpropanol (solvent)

100 mg.

The following procedure is used for the production of approximately 10,000 capsules:

250 g. of 1-methyl-$\Delta^1$-androstene-17B-ol-3-one-17-acetate are dissolved by stirring into 750 g. of 1-phenylpropanol at room temperature, and the solution is then filtered.

By means of a gelatin capsule filling machine the solution is introduced into 2 minim gelatin capsules to an amount of 100 mg. per capsule. The capsule can then be hardened in the usual manner.

*Example 3*

This example relates to the production of gelatin capsules containing 1-methyl-$\Delta^1$-androstene-17$\beta$-ol-3-one as the active ingredient, each capsule containing approximately 10 mg. of the active ingredient.

COMPOSITION FOR EACH CAPSULE

| | Mg. |
|---|---|
| 1-methyl-$\Delta^1$-androstene-17$\beta$-ol-3-one active ingredient | 10 |
| 1-phenylpropanol (solvent) | 90 |
| | 100 |

The solution is introduced into 2 minim hard gelatin capsules in an amount of about 100 mg. per capsule by means of a gelatin capsule filling machine. The capsules can subsequently be further hardened in the usual manner.

*Example 4*

This example relates to the production of tablets, each tablet containing 10 mg. of 1-methyl-$\Delta^1$-androstene-17$\beta$-ol-3-one-17-acetate as the active ingredient.

COMPOSITION FOR EACH TABLET

| | Mg. |
|---|---|
| 1-methyl-$\Delta^1$-androstene-17$\beta$-ol-3-one-17-acetate (active ingredient) | 10.000 |
| Milk sugar | 36.000 |
| Corn starch | 66.565 |
| Talcum | 6.000 |
| Gelatin | 1.400 |
| p-Oxybenzoic acid-methyl ester (methyl paraben) | 0.024 |
| p-Oxybenzoic acid-propylester (propyl paraben) | 0.011 |
| | 120.000 |

The milk sugar, corn starch, talcum and gelatin act as fillers, and the p-oxybenzoic acid-methyl ester and p-oxybenzoic acid-propyl ester act as preservatives.

The following description relates to the production of approximately 10,000 tablets:

100 g. of 1-methyl-$\Delta^1$-androstene-17$\beta$-ol-3-one-17-acetate,
360 g. of milk sugar and
540 g. of corn starch are granulated with
360 cc. of an aqueous solution which contains
14 g. of gelatin,
0.24 g. of p-oxybenzoic acid-methyl ester and
0.11 g. of p-oxybenzoic acid-propyl ester. After drying (15 hours at 45° C.) and passing through a sieve, the granulate is mixed with
125.65 g. of corn starch and
60.00 g. of talcum, and by means of a slightly curved 7 mm. pestle are pressed into tablets each weighing about 120 mg.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An oral anabolic composition, containing 1-methyl-$\Delta^1$-androstene-17$\beta$-ol-3-one as active ingredient; and a pharmaceutical carrier for peroral administration.

2. An oral anabolic composition in per day unit dose form, containing between about 5 and 60 mg. of 1-methyl-$\Delta^1$-androstene-17$\beta$-ol-3-one as active ingredient; and a pharmaceutical carrier for peroral administration.

3. An oral anabolic composition in per day unit dose form, containing between about 10–20 mg. of 1-methyl-$\Delta^1$-androstene-17$\beta$-ol-3-one as active ingredient; and a pharmaceutical carrier for peroral administration.

4. Method of treating an animal requiring an anabolic agent, which comprises orally administering to such animal a compound selected from the group consisting of 1-methyl-$\Delta^1$-androstene-17$\beta$-ol-3-one and 1-methyl-$\Delta^1$-androstene-17$\beta$-ol-3-one-17-acetate.

5. Method of treating a human patient requiring administration of an anabolic agent, which comprises orally administering to such patient a compound selected from the group consisting of 1-methyl-$\Delta^1$-androstene-17$\beta$-ol-3-one and 1-methyl-$\Delta^1$-androstene-17$\beta$-ol-3-one-17-acetate.

6. Method of treating a human patient requiring administration of an anabolic agent, which comprises orally administering to such patient a compound selected from the group consisting of 1-methyl-$\Delta^1$-androstene-17$\beta$-ol-3-one and 1-methyl-$\Delta^1$-androstene-17$\beta$-ol-3-one-17-acetate in an amount of about 5–60 mg. per day.

7. Method of treating a human patient requiring administration of an anabolic agent, which comprises orally administering to such patient a compound selected from the group consisting of 1-methyl-$\Delta^1$-androstene-17$\beta$-ol-3-one and 1-methyl-$\Delta^1$-androstene-17$\beta$-ol-3-one-17-acetate in an amount of about 10–20 mg. per day.

8. Method of treating a human patient requiring administration of an anabolic agent, which comprises orally administering to such patient 1-methyl-$\Delta^1$-androstene-17$\beta$-ol-3-one.

9. Method of treating a human patient requiring administration of an anabolic agent, which comprises orally administering to such patient 1-methyl-$\Delta^1$-androstene-17$\beta$-ol-3-one in an amount of about 5–60 mg. per day.

References Cited by the Examiner

UNITED STATES PATENTS

| 2,697,109 | 12/1954 | Dodson | 260—397.3 |
| 2,962,510 | 11/1960 | Hiersemann et al. | 260—397.4 |
| 3,006,929 | 10/1961 | Colton et al. | 260—397.4 |
| 3,134,792 | 5/1964 | Kaspar et al. | 260—397.4 |

OTHER REFERENCES

Djerassi et al.: J.A.C.S., 72, pp. 4534–40 (1950).

FRANK CACCIAPAGLIA, JR., *Primary Examiner.*